(12) United States Patent
Leen et al.

(10) Patent No.: US 11,754,478 B2
(45) Date of Patent: Sep. 12, 2023

(54) RAPID EQUILIBRATOR FOR WATER ISOTOPE ANALYSIS

(71) Applicant: ABB Schweiz AG, Baden (CH)

(72) Inventors: J. Brian Leen, Sunnyvale, CA (US); Doug S. Baer, Menlo Park, CA (US); Susan L. Fortson-Gardner, San Jose, CA (US)

(73) Assignee: ABB Schweiz AG, Baden (CH)

( * ) Notice: Subject to any disclaimer, the term of this patent is extended or adjusted under 35 U.S.C. 154(b) by 905 days.

(21) Appl. No.: 16/541,102

(22) Filed: Aug. 14, 2019

(65) Prior Publication Data

US 2020/0055017 A1    Feb. 20, 2020

Related U.S. Application Data

(60) Provisional application No. 62/719,126, filed on Aug. 16, 2018.

(51) Int. Cl.
| | | |
|---|---|---|
| *G01N 1/44* | (2006.01) | |
| *H01J 49/04* | (2006.01) | |
| *G01N 1/00* | (2006.01) | |
| *G01N 30/12* | (2006.01) | |
| *G01N 30/18* | (2006.01) | |

(52) U.S. Cl.
CPC .............. *G01N 1/44* (2013.01); *G01N 30/12* (2013.01); *G01N 30/18* (2013.01); *H01J 49/0445* (2013.01); *H01J 49/0454* (2013.01); *H01J 49/0468* (2013.01); *B01J 2219/00286* (2013.01); *B01J 2219/00704* (2013.01); *G01N 2001/002* (2013.01); *G01N 2030/126* (2013.01)

(58) Field of Classification Search
CPC .............. H01J 49/0468; H01J 49/0445; H01J 49/0454; G01N 1/44; G01N 2001/002
See application file for complete search history.

(56) References Cited

U.S. PATENT DOCUMENTS

| | | | |
|---|---|---|---|
| 2,004,074 A | * | 6/1935 | Kiley .................... B65D 90/30 55/494 |
| 4,158,547 A | | 6/1979 | Rousseau et al. |
| 4,529,879 A | | 7/1985 | Schmit |

(Continued)

FOREIGN PATENT DOCUMENTS

| | | |
|---|---|---|
| EP | 0551847 A1 | 7/1993 |
| JP | S601556 A | 1/1985 |

OTHER PUBLICATIONS

European Search Report for EP 19 19 2031, dated Jan. 9, 2020, 9 pages.

(Continued)

*Primary Examiner* — Paul M. West
(74) *Attorney, Agent, or Firm* — Armstrong Teasdale LLP (57) ABSTRACT

Technologies for rapid equilibration for water isotope analysis are disclosed. In at least one illustrative embodiment, a vaporizer may include an injection block that defines a chamber and a septum positioned over an inlet of the chamber to seal the chamber. The chamber may be configured to be fluidly coupled to a pump to develop a vacuum within the chamber, and the septum may be configured to receive a needle that is inserted into the chamber. A thermally conductive wool may be positioned within the chamber and may be configured to receive a tip of the needle.

18 Claims, 6 Drawing Sheets

(56) References Cited

U.S. PATENT DOCUMENTS

| | | | |
|---|---|---|---|
| 4,732,046 A | | 3/1988 | Lawrence et al. |
| 5,135,875 A | | 8/1992 | Meucci et al. |
| 5,458,739 A | * | 10/1995 | Boucher .............. B01D 3/4205 |
| | | | 203/88 |
| 5,760,189 A | | 6/1998 | Vicik et al. |
| 5,783,445 A | | 7/1998 | Murnick |
| 5,831,027 A | | 11/1998 | McIntosh et al. |
| 5,917,140 A | * | 6/1999 | Tom ................... B01D 53/0438 |
| | | | 96/143 |
| 6,795,190 B1 | | 9/2004 | Paul et al. |
| 6,839,140 B1 | | 1/2005 | O'Keefe et al. |
| 7,048,907 B2 | | 5/2006 | Groman et al. |
| 7,307,059 B2 | | 12/2007 | Hellerstein |
| 7,435,406 B2 | | 10/2008 | Schneider |
| 7,449,171 B2 | | 11/2008 | Hellerstein |
| 7,468,797 B1 | | 12/2008 | O'Keefe et al. |
| 7,504,233 B2 | | 3/2009 | Hellerstein |
| 7,618,827 B2 | | 11/2009 | Steven |
| 8,656,753 B1 | * | 2/2014 | Silvis .................. G01N 30/12 |
| | | | 95/88 |
| 8,823,923 B2 | | 9/2014 | Berman et al. |
| 9,110,008 B2 | | 8/2015 | Baer et al. |
| 2002/0118364 A1 | | 8/2002 | Amonette et al. |
| 2004/0081994 A1 | | 4/2004 | Hellerstein |
| 2006/0020440 A1 | | 1/2006 | Hellerstein |
| 2006/0084180 A1 | | 4/2006 | Paldus et al. |
| 2007/0248540 A1 | | 10/2007 | Hellerstein |
| 2008/0221412 A1 | | 9/2008 | Baker et al. |
| 2009/0223310 A1 | * | 9/2009 | Syage .................. G01N 1/2205 |
| | | | 73/863.23 |
| 2009/0305322 A1 | | 12/2009 | Hegg et al. |
| 2010/0122564 A1 | * | 5/2010 | Crosson ................ B01B 1/005 |
| | | | 73/1.03 |
| 2010/0322865 A1 | | 12/2010 | Duerk et al. |
| 2012/0053562 A1 | * | 3/2012 | Haase ............... A61M 5/14276 |
| | | | 604/93.01 |
| 2013/0027705 A1 | | 1/2013 | Berman et al. |
| 2016/0158748 A1 | * | 6/2016 | Wu .................... B01L 3/50273 |
| | | | 422/504 |

OTHER PUBLICATIONS

Xue-Fa Wen, "Intercompariosn of Four Commercial Analyzers for Water Vapor Isotope Measurement", Journal of Atmospheric and Oceanic Technology, American Meteorological Society, vol. 29, No. 2, Feb. 1, 2012, 13 pages.

Elena S.F. Berman et al., "High-frequency field-deployable isotope analyzer for hydrological applications," Water Resources Research, Oct. 14, 2009, vol. 45(W10201), 7 pages.

Elena S.F. Berman et al., "Measurement of δ18O,δ17O, and 17O-excess in Water by Off-Axis Integrated Cavity Output Spectroscopy and Isotope Ratio Mass Spectrometry," Analytical Chemistry, Sep. 16, 2013, vol. 85(21), 10392-10398 pages.

Elena S.F. Berman et al., "Direct Analysis of δ2H and δ18O in Natural and Enriched Human Urine Using Laser-Based, Off-Axis Integrated Cavity Output Spectroscopy," Analytical Chemistry, Nov. 20, 2012, vol. 84(22), 9768-9773 pages.

* cited by examiner

RAPID EQUILIBRATOR FOR WATER ISOTOPE ANALYSIS

CROSS-REFERENCE TO RELATED APPLICATIONS

This application claims the benefit of and priority to U.S. Provisional Application No. 62/719,126, filed Aug. 16, 2018, and entitled "RAPID EQUILIBRATOR FOR WATER ISOTOPE ANALYSIS," which is incorporated by reference herein in its entirety.

TECHNICAL FIELD

The present disclosure relates generally to components for water isotope analysis and, more specifically, to a rapid equilibrator for such analysis.

BACKGROUND

Water injection brings inherent problems when injecting into hollow enclosures that are exposed to pressures lower than 20 mbar. This issue occurs generally for the introduction of liquid samples into a low-pressure vaporizer intended to quantitatively evaporate the sample. Liquid water samples are converted into the gas phase for analysis by cavity enhanced absorption spectroscopy (e.g., Off-Axis Integrated Cavity Output Spectroscopy (OA-ICOS), Cavity Ringdown Spectroscopy (CRDS)) or multipass absorption spectroscopy (e.g., Harriet Cell) by evaporating the liquid sample. This typically occurs by introducing the liquid into a heated chamber (e.g., 40-100 C) at reduced pressure (e.g., <8 torr). The liquid water is introduced with a micro-syringe that injects about 1 µL of water. Because of the small volumes, the needle constitutes part of the syringe volume and is plunged with a wire. This configuration results in evaporation in the sample chamber and on/in the needle. Because the needle is not pre-heated, the evaporation can be non-uniform on the needle as well as in the chamber, where local water cooling may reduce conversion to vapor.

The energy needed for fast and complete evaporation is not always available at the tip of the needle. As such, the evaporation process will use the energy stored in the water and thus decrease the temperature quickly. This leads to non-uniform, slow, and incomplete evaporation, which causes isotopic fractionation across all isotopomers of the water sample. Previous attempts to solve this issue have included heated chambers, low pressure chambers, longer evaporation times, or some combination of these.

An additional problem sometimes associated with liquid to gas conversion is the plating of contaminants such as salts onto heated surfaces. This happens when analyzing brackish waters or body waters (e.g., urine, blood, serum). The contaminated surfaces lead to poor conversion to the gas phase and thus require frequent cleaning, which increases maintenance and per measurement costs.

SUMMARY

The present disclosure includes one or more of the features recited in the appended claims and/or the following features which, alone or in any combination, may comprise patentable subject matter.

According to one aspect of the present disclosure, a vaporizer may comprise an injection block that defines a chamber, a septum positioned over an inlet of the chamber to seal the chamber, and a thermally conductive wool positioned within the chamber. The chamber may be configured to be fluidly coupled to a pump to develop a vacuum within the chamber. The septum may be configured to receive a needle that is inserted into the chamber. The thermally conductive wool may be configured to receive a tip of the needle.

In some embodiments, the injection block may be configured to be heated to heat the thermally conductive wool.

In some embodiments, the injection block may be configured to be heated with at least one of a resistive heating element, an inductive heating element, or an infrared light.

In some embodiments, the thermally conductive wool may be configured to heat the tip of the needle.

In some embodiments, the wool may be configured to be heated with at least one of a resistive heating element, an inductive heating element, or an infrared light.

In some embodiments, the needle may be configured to be heated with at least one of a resistive heating element, an inductive heating element, or an infrared light.

In some embodiments, the thermally conductive wool may comprise a wire mesh.

In some embodiments, the thermally conductive wool may comprise at least one of silver, gold, brass, copper, steel, aluminum, or a diamond coating.

In some embodiments, an interior surface of the injection block may be at least one of diamond coated or chemically etched.

In some embodiments, the vaporizer may further comprise additional thermally conductive wool positioned outside of the chamber, the additional thermally conductive wool configured to be heated to heat a portion of the needle that is not inserted into the chamber.

According to another aspect of the present disclosure, a spectrometer may comprise a vaporizer according to any of the embodiments described above, a pump fluidly coupled to the chamber and configured to develop the vacuum within the chamber, and an analyzer block configured to receive vapors generated in the chamber of the vaporizer.

In some embodiments, the spectrometer may further comprise at least one of a resistive heating element, an inductive heating element, or an infrared light configured to heat the injection block such that the thermally conductive wool is also heated.

According to yet another aspect of the present disclosure, a method of vaporizing a liquid sample may comprise heating an injection block to heat a thermally conductive wool positioned within a vacuum chamber defined in the injection block, inserting a needle through a septum such that a tip of the needle is positioned within the vacuum chamber, advancing the tip of the needle into the thermally conductive wool, and injecting the liquid sample from the needle into the vacuum chamber.

In some embodiments, the method may further comprise heating an additional thermally conductive wool positioned outside of the vacuum chamber and inserting the needle through the additional thermally conductive wool such that a portion of the needle positioned outside of the vacuum chamber is positioned within the additional thermally conductive wool when the needle is inserted through the septum.

In some embodiments, the method may further comprise vaporizing the liquid sample injected from the needle with the thermally conductive wool.

According to still another aspect of the present disclosure, a vaporizer may comprise an injection block that defines a chamber, an atomizer nozzle from which an atomized sample is introduced into the chamber, and thermally conductive wool positioned within the chamber. The chamber may be configured to be fluidly coupled to a pump to develop a vacuum within the chamber, and the thermally conductive wool may be configured to receive the atomized sample.

According to yet still another aspect of the present disclosure, a vaporizer may comprise an injection block that defines a chamber, where the chamber is configured to be fluidly coupled to a pump to develop a vacuum within the chamber, and a septum positioned over an inlet of the chamber to seal the chamber, where the septum is configured to receive a needle that is inserted into the chamber. The vaporizer may further comprise a first electrical terminal positioned within the chamber and configured to make electrical contact with the needle at a first location when the needle is inserted through the septum, and a second electrical terminal configured to make electrical contact with the needle at a second location to flow a current through at least a portion of the needle.

In some embodiments, the second electrical terminal may be positioned within the chamber.

In some embodiments, the second electrical terminal may be positioned outside the chamber.

In some embodiments, the second electrical terminal may be positioned adjacent the septum.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
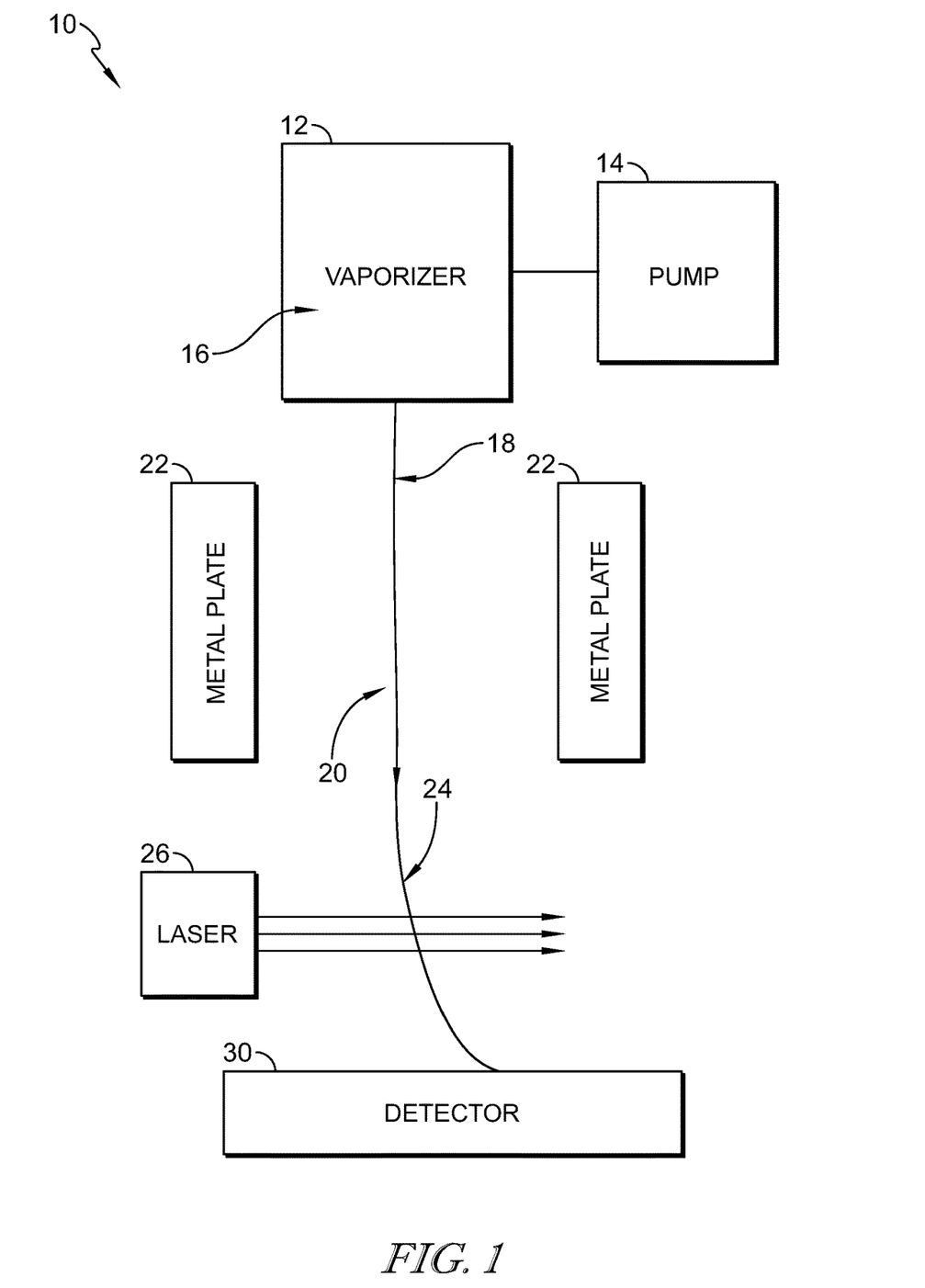
FIG. 1 is a schematic diagram of a spectrometer having a vaporizer in accordance with an embodiment.

Referring to FIG. 1, a spectrometer 10 includes a vaporizer 12 that is coupled to a pump 14 to develop a vacuum within a chamber 16 within the vaporizer 12. A sample is positioned within the vaporizer 12 to vaporize the sample. The vaporized sample 18 exits the vaporizer 12 into an electric field 20 developed between two metal plates 22 charged to a high voltage. The electric field 20 causes the ions 24 of different atoms in the vaporized sample to accelerate. Ions of different atoms have different amounts of electric charge. The more highly charged ions are accelerated most, thereby separating the ions according to their respective amounts of charge.

The ions 24 are passed through a laser 26. When moving ions 24 with an electric charge are hit by the laser 26, the ions 24 bend into an arc, with the lighter more positively charged particles bending more than the heavier more negatively charged particles. The ions 24 split into a spectrum, with each different type of ion 24 bent a different amount according to its mass and its electrical charge. An electrical detector 30 records a spectrum pattern showing how many ions 24 arrive for each mass/charge. This spectrum can be used to identify the atoms or molecules in the original sample.

The spectrometer 10 enables the identification of isotope concentrations in a liquid sample, for example water. In particular, an isotope concentration provides information regarding isotope ratios, for example, the ratios of $^{16}O$, $^{17}O$, and $^{18}O$ in water. This information may be utilized to determine an age of the liquid sample, details about an organism from which the liquid sample is derived, or verification of a liquid sample. Examples of liquid samples that may be analyzed using the spectrometer and embodiments described below include water, wine and spirits, bodily fluids (e.g. blood and saliva), eggs, milk, or juice.

Figure 2:
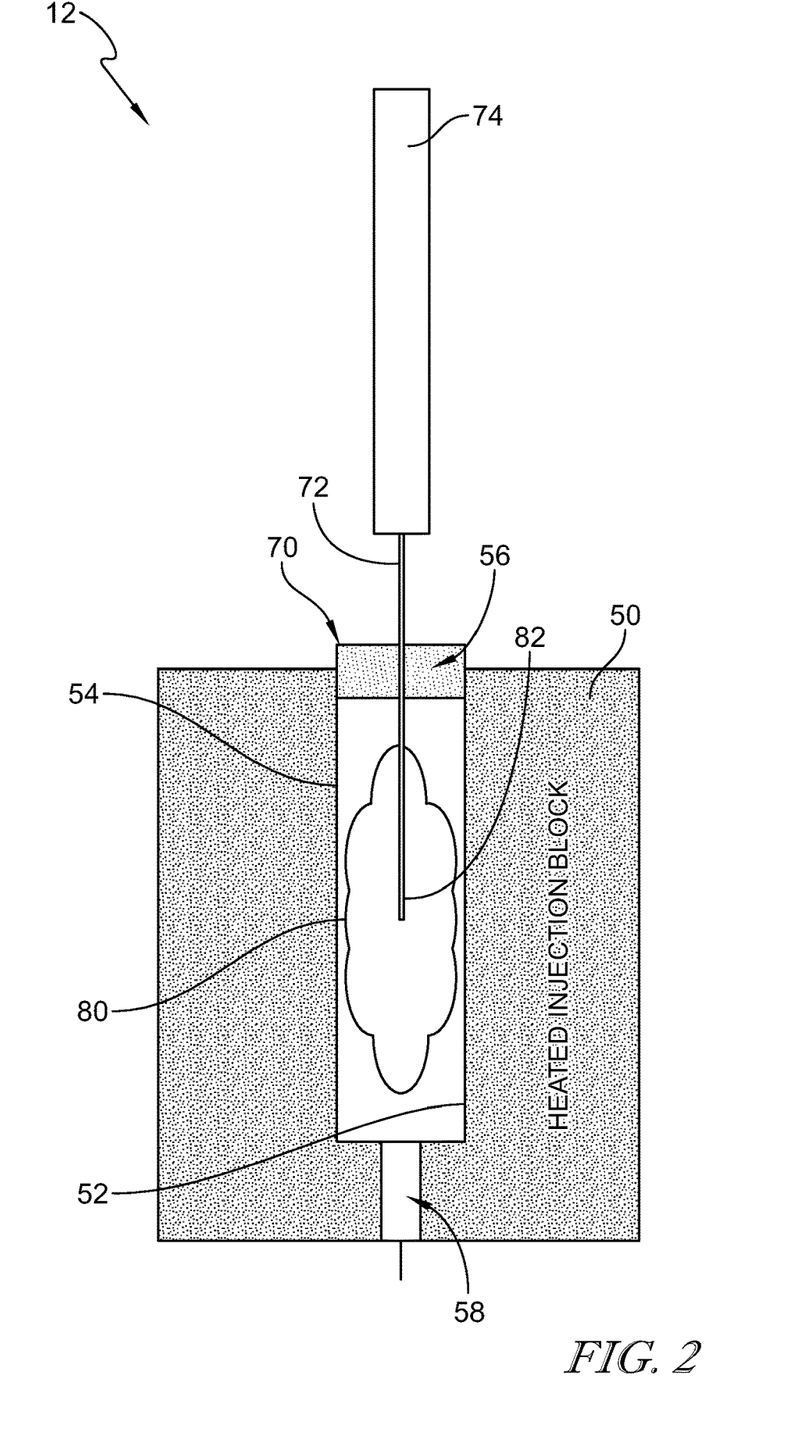
FIG. 2 is a schematic diagram of an embodiment of a heated injection block having a thermally conductive wool positioned within a chamber of the block.

Referring to FIG. 2, a modified injection port for a vaporizer 12 improves evaporation of liquid water samples for gas phase analysis. The evaporation improves by increasing a surface area and total heat capacity of an evaporating surface to improve the determinism of the evaporation process. The improved thermal transfer is provided by a quantity of thermally conductive wool 80 inserted into the injection port. In some embodiments the conductive wool 80 is a structured or woven thermal conductor, e.g., a wire mesh. This mesh may be placed in any orientation within the injection chamber. The thermally conductive wool 80 provides excellent thermal conductivity and copious surface area to ensure non-fractionating evaporation of the injected water. The thermally conductive wool 80 may be placed such that injected water immediately strikes the thermally conductive wool 80 and/or such that an injection needle 72 is also heated by the thermally conductive wool 80.

The disclosed embodiments have been tested by direct implementation by inserting thermally conductive wool 80 into existing commercially available injection ports. Comparison of repeated isotopic measurements (e.g., d2H, d18O, d17O) shows improved repeatability with smaller variability in measured results.

The vaporizer 12 includes an injection block 50 that defines the vacuum chamber 16. The injection block 50 has an inner surface 52 that forms the walls 54 of the vacuum chamber 16. The injection block 50 is heated with a heating element (not shown). In an exemplary embodiment, the injection block 50 is heated with a resistive heating element. Optionally, the injection block 50 may be heated using an inductive heating element for heating on demand while using low average power consumption, e.g. in mobile applications. In some embodiments, ultrasonic evaporation is combined with a resistive heating system. Additionally or alternatively, an infrared light may be used for heating. In any of these embodiments, the heating element may be used to directly heat the needle 72 and/or the thermally conductive wool 80 (in addition or alternative to indirect heating via the injection block 50).

In some embodiments, the inner surface 52 block of the injection block 50 is diamond coated. Alternatively, a high surface area injection block insert may be positioned along the inner surface 52 of the injection block 50. For example, the inner surface 52 of the injection block 50 may be a chemically etched surface. The injection block 50 includes an inlet 56 that opens into the vacuum chamber 16, and an outlet 58 that opens to the vacuum chamber 16.

The inlet 56 is sealed with a septum 70. The septum 70 is formed from a rubber material and is capable of receiving the needle 72 of a syringe 74. That is, the needle 72 of the syringe 74 can pass through the septum 70 while maintaining a seal for the vacuum chamber 16. In some embodiments, the syringe 74 may be a quartz injection tube that enables the use of radiation heating.

Thermally conductive wool 80 is positioned within the vacuum chamber 16. In an exemplary embodiment, the thermally conductive wool 80 is formed from silver. In some embodiments, alternative wool materials may be used, e.g. gold, brass, copper, steel, or aluminum. The thermally conductive wool 80 may also be diamond coated. The thermally conductive wool 80 is configured to be heated by the injection block 50. When the needle 72 is inserted into the vacuum chamber 16, a tip 82 of the needle 72 is inserted into the thermally conductive wool 80, so that the thermally conductive wool 80 heats the tip 82 of the needle 72. Some embodiments also include single surface heating of the needle 72. For example, a high conductivity surface may be pressed against the needle 72 once the needle 72 is inserted into the vacuum chamber 16.

The thermally conductive wool 80 provides a high surface area heated surface that comes in contact with the tip 82 of the needle 72 without restricting flow and increasing back pressure. The thermally conductive wool 80 allows the needle 72 to "nest" without obstructing the flow of water, simultaneously providing the surface area and energy to ensure rapid, homogeneous, and repeatable vaporization of liquid samples for isotopic analysis via laser based spectroscopic techniques. This ensures that the entire sample is vaporized homogenously to avoid fractionation effects. This results in an improvement in the precision of the measured isotopic ratio. The disclosed embodiments also. The higher surface area also improves tolerance to salty samples by allowing more salt to plate out on the thermally conductive wool 80 before the liquid to gas conversion becomes inefficient.

Figure 3:
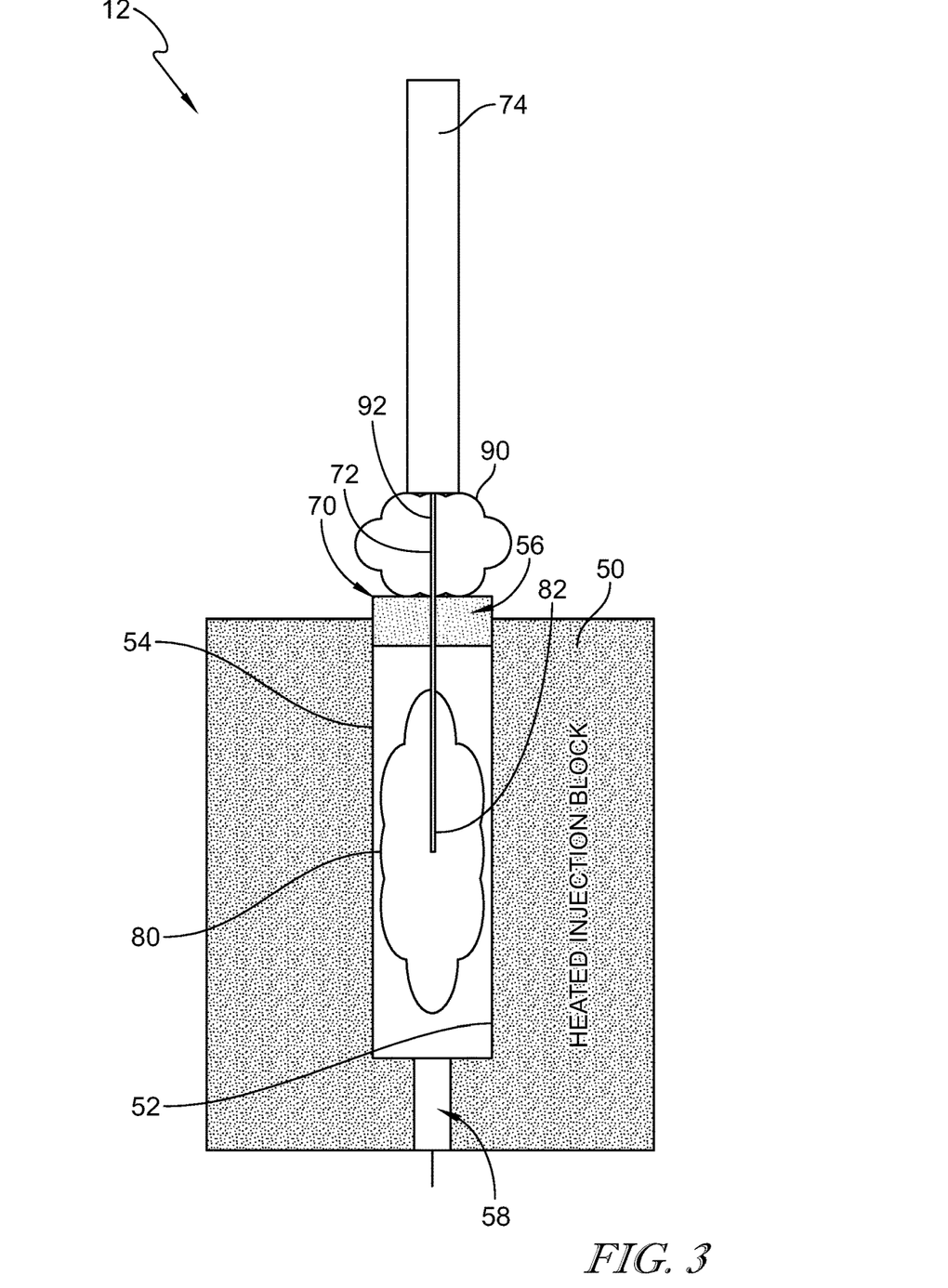
FIG. 3 is a schematic diagram of another embodiment of a heated injection block having a thermally conductive wool positioned within a chamber of the block.

In the embodiment shown in FIG. 3, other thermally conductive wool 90 is positioned outside of the vacuum chamber 16 above the septum 70. This thermally conductive wool 90 is also heated by the injection block 50. Accordingly, in the embodiment illustrated in FIG. 3, the thermally conductive wool 80 heats the tip 82 of the needle 72, and the thermally conductive wool 90 heats the portion 92 of the needle 72 positioned outside of the vacuum chamber 16.

Figure 4:
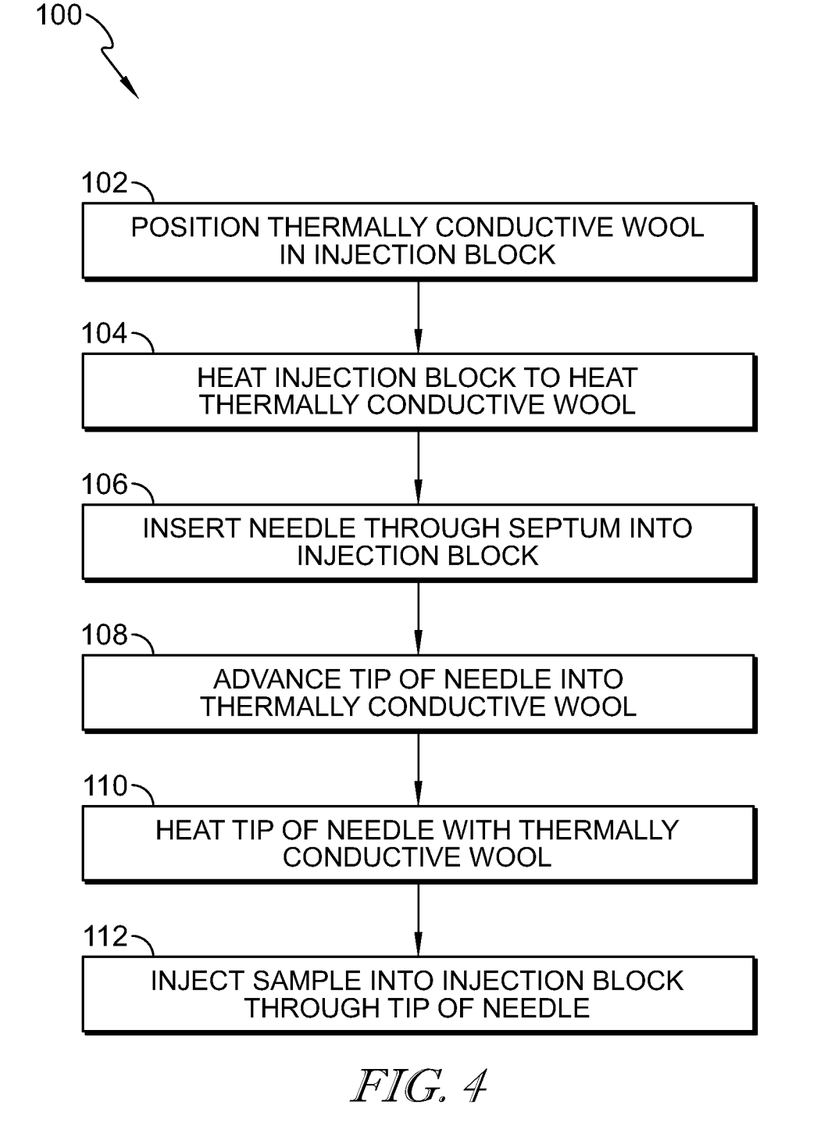
FIG. 4 is a flowchart of a method for vaporizing a liquid, which may be used with the device of FIG. 2 or FIG. 3.

Referring to FIG. 4, a method 100 for vaporizing a liquid sample using the injection block 50 includes positioning the thermally conductive wool 80 within the injection block 50, at block 102. At block 104, the injection block 50 is heated to heat the thermally conductive wool 80. Optionally, the injection block 50 may also be heated to heat thermally conductive wool 90 positioned outside of the vacuum chamber 16. At block 106, the needle 72 is inserted through the septum 70 and into the vacuum chamber 16. The tip 82 of the needle 72 is advanced into the heated thermally conductive wool 80, at block 108. At block 110, the thermally conductive wool 80 heats the tip 82 of the needle 72. The liquid sample is injected from the needle 72 into the thermally conductive wool 80 to vaporize the liquid sample, at block 112.

In some embodiments, the needle 72 may be replaced by an atomizer nozzle configured to introduce an atomized sample into the chamber 16. In such embodiments, the thermally conductive wool 80 positioned within the chamber 16 may be configured to receive the atomized sample. The thermally conductive wool 80 (and the remainder of the vaporizer 12) of such embodiments may operate substantially as described above.

In some embodiments, heating by the wool may be replaced with direct, resistive heating of the needle 72. This heating may be achieved by flowing current through the needle 72 itself to create heat immediately prior to, during, or after the injection is made. This can be achieved in a variety of ways, one of which is shown diagrammatically in FIG. 5, where current is applied via positive, spring force terminals 120 inside the injection port and the negative or ground terminal 122 is attached to the top of the needle. The spring clips are isolated from the normally electrically conductive injection block 50 by high-temperature-tolerant electrical insulation, such as ceramic plates 130. While not a requirement, placing the positive terminal inside the injection block reduces the risk of electrical shorts. Low voltage DC current can be used to minimize the risk of shock.

Figure 5:
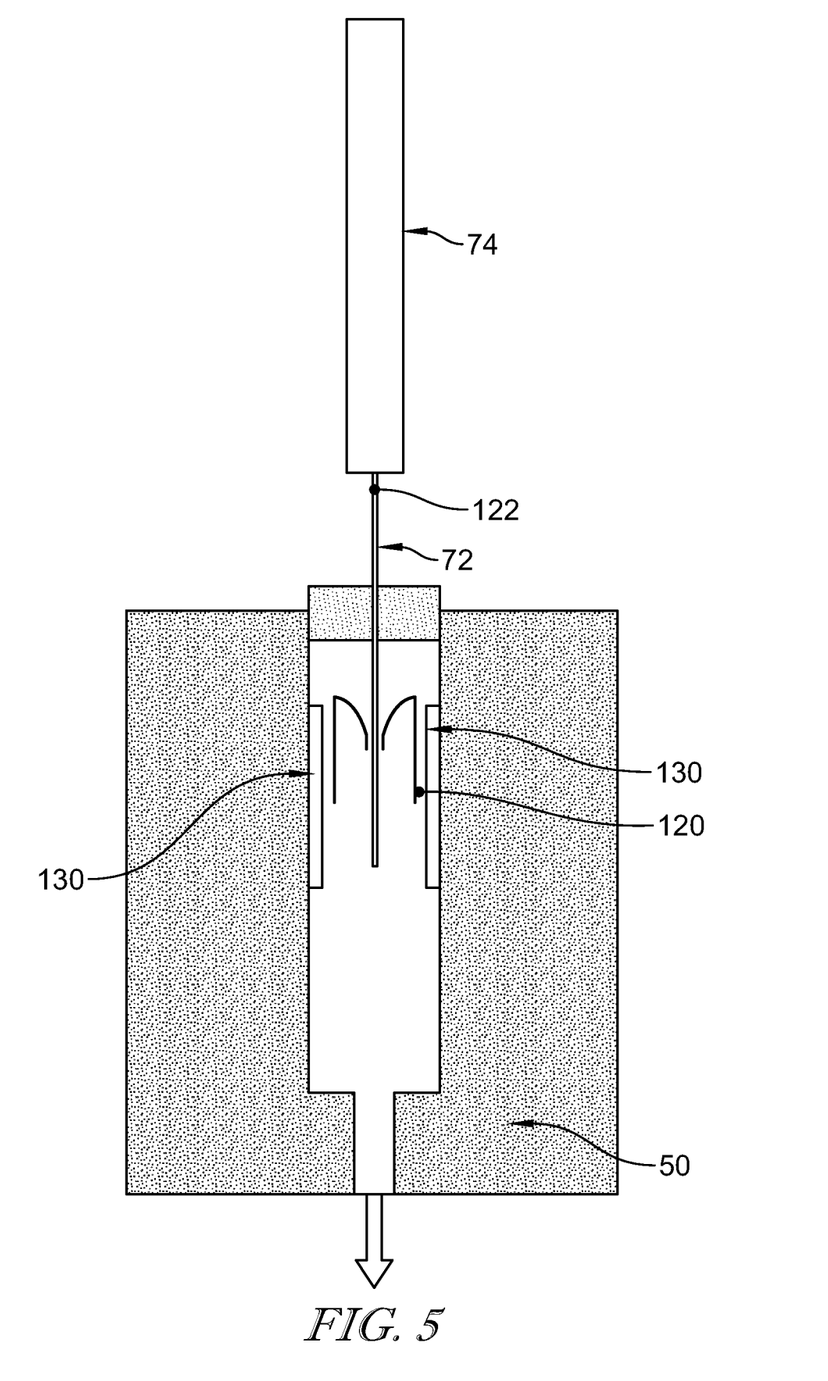
FIG. 5 is a schematic diagram of an embodiment of a heated injection block having spring force terminals positioned within a chamber of the block.
Figure 6:
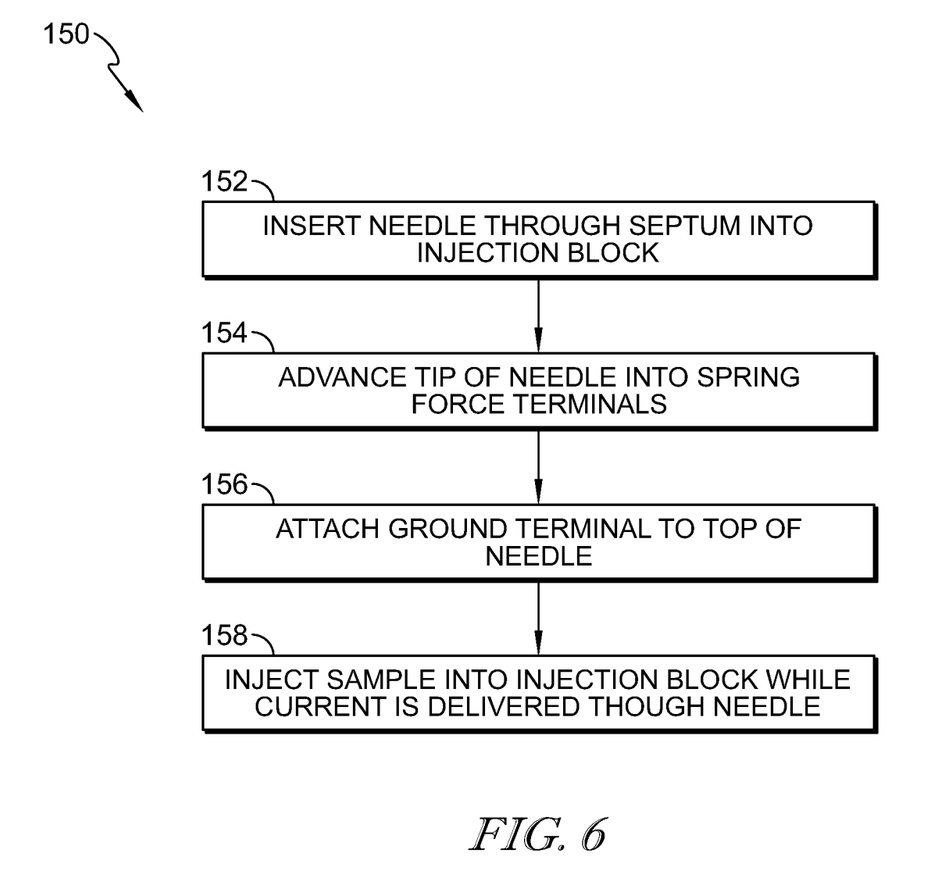
FIG. 6 is a flowchart of another method for vaporizing a liquid, which may be used with the device of FIG. 5.

Referring to FIG. 6, a method 150 for vaporizing a liquid sample using the injection block 50, shown in the embodiment of FIG. 5 includes inserting the needle 72 through the septum 70 and into the vacuum chamber 16, at block 152. The tip 82 of the needle 72 is advanced into the spring force terminals 120, at block 154. At block 156, the ground terminal 122 is attached to the top of the needle. The liquid sample is injected from the needle 72 while a current is delivered between the spring force terminals 120 and the ground terminal 122 to vaporize the liquid sample, at block 158.

The disclosed embodiments improve the isotopic measurement accuracy and precision of liquid water samples.

The disclosed embodiments are applicable to isotopic measurements made with cavity enhanced optical spectroscopy (e.g., Off-axis ICOS and CRDS) where the water sample is vaporized by introduction via an injection of liquid water into a low pressure sample chamber. However, the concept may be extended to other liquids that are injected into low pressure sample chambers for vaporization and subsequent isotopic analysis.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A vaporizer comprising:
an injection block that defines a chamber, wherein the chamber is configured to be fluidly coupled to a pump to develop a vacuum within the chamber,
a septum positioned over an inlet of the chamber to seal the chamber, the septum configured to receive a needle that is inserted into the chamber,
a first thermally conductive wool positioned within the chamber and configured to receive a tip of the needle, and
a second thermally conductive wool positioned outside of the chamber, the second thermally conductive wool configured to be heated to heat a portion of the needle that is not inserted into the chamber.

2. The vaporizer of claim 1, wherein the injection block is configured to be heated to heat the first thermally conductive wool.

3. The vaporizer of claim 2, wherein the injection block is configured to be heated with at least one of a resistive heating element, an inductive heating element, or an infrared light.

4. The vaporizer of claim 2, wherein the first thermally conductive wool is configured to heat the tip of the needle.

5. The vaporizer of claim 1 further comprising a heating element configured to directly heat the first thermally conductive wool within the chamber.

6. The vaporizer of claim 1, wherein the needle is configured to be heated with at least one of a resistive heating element, an inductive heating element, or an infrared light.

7. The vaporizer of claim 1, wherein the first thermally conductive wool comprises a wire mesh.

8. The vaporizer of claim 1, wherein the first thermally conductive wool comprises at least one of a silver, gold, brass, copper, steel, aluminum, or a diamond coating.

9. The vaporizer of claim 1, wherein an interior surface of the injection block is at least one of diamond coated or chemically etched.

10. A spectrometer comprising:
a vaporizer according to claim 1,
a pump fluidly coupled to the chamber and configured to develop the vacuum within the chamber, and
an analyzer block configured to receive vapors generated in the chamber of the vaporizer.

11. The spectrometer of claim 10, further comprising at least one of a resistive heating element, an inductive heating element, or an infrared light configured to heat the injection block such that the first thermally conductive wool is also heated.

12. A method of vaporizing a water sample, the method comprising:
heating an injection block to heat a first thermally conductive wool positioned within a vacuum chamber defined in the injection block, the first thermally conductive wool including at least one of a metallic material or a diamond coating,
heating a second thermally conductive wool positioned outside of the vacuum chamber,
inserting a needle through a septum such that a tip of the needle is positioned within the vacuum chamber,
inserting the needle through the second thermally conductive wool such that a portion of the needle positioned outside of the vacuum chamber is positioned within the second thermally conductive wool when the needle is inserted through the septum,
advancing the tip of the needle into the first thermally conductive wool, and
injecting the water sample from the needle into the vacuum chamber.

13. The method of claim 12, further comprising vaporizing the water sample injected from the needle with the first thermally conductive wool.

14. A vaporizer comprising:
an injection block that defines a chamber, wherein the chamber is configured to be fluidly coupled to a pump to develop a vacuum within the chamber,
an atomizer nozzle from which an atomized sample is introduced into the chamber, and
thermally conductive wool positioned within the chamber and configured to receive the atomized sample, wherein the injection block further defines an outlet sized to direct vapors generated in the chamber to a detector, the detector being configured to identify isotope concentrations in the atomized sample.

15. A vaporizer comprising:
an injection block that defines a chamber, wherein the chamber is configured to be fluidly coupled to a pump to develop a vacuum within the chamber,
a septum positioned over an inlet of the chamber to seal the chamber, the septum configured to receive a needle that is inserted into the chamber,
a first electrical terminal positioned within the chamber and configured to make electrical contact with the needle at a first location when the needle is inserted through the septum, wherein the first electrical terminal is a spring force terminal, and
a second electrical terminal configured to make electrical contact with the needle at a second location to flow a current through at least a portion of the needle.

16. The vaporizer of claim 15, wherein the second electrical terminal is positioned within the chamber.

17. The vaporizer of claim 15, wherein the second electrical terminal is positioned outside the chamber.

18. The vaporizer of claim 17, wherein the second electrical terminal is positioned adjacent the septum.

* * * * *